United States Patent [19]

Jacobson et al.

[11] Patent Number: 4,648,961

[45] Date of Patent: Mar. 10, 1987

[54] METHOD OF PRODUCING HIGH AROMATIC YIELDS THROUGH AROMATICS REMOVAL AND RECYCLE OF REMAINING MATERIAL

[75] Inventors: Robert L. Jacobson, Vallejo; Lawrence W. Jossens, Berkeley, both of Calif.

[73] Assignee: Chevron Research Company, San Francisco, Calif.

[21] Appl. No.: 641,638

[22] Filed: Aug. 17, 1984

Related U.S. Application Data

[63] Continuation-in-part of Ser. No. 426,376, Sep. 29, 1982.

[51] Int. Cl.$^4$ .......................... C10G 35/06; C07C 2/52
[52] U.S. Cl. ..................................... 208/138; 585/419
[58] Field of Search ........... 208/138, 326, 335, 310 Z; 585/419, 827

[56] References Cited

U.S. PATENT DOCUMENTS

| | | | |
|---|---|---|---|
| 2,958,644 | 11/1960 | Kimberlin et al. | 208/64 |
| 3,397,137 | 8/1968 | Pickert et al. | 502/79 |
| 3,526,587 | 9/1970 | O'Connor | 208/335 |
| 3,783,123 | 1/1974 | Young | 208/111 |
| 4,036,745 | 7/1977 | Broughton | 208/310 Z |
| 4,104,320 | 8/1978 | Bernard et al. | 208/141 |
| 4,191,615 | 3/1980 | Schulz et al. | 208/326 |

FOREIGN PATENT DOCUMENTS

895280  3/1972  Canada.

*Primary Examiner*—Curtis R. Davis
*Attorney, Agent, or Firm*—S. R. La Paglia; E. A. Schaal; P. L. McGarrigle, Jr.

[57] ABSTRACT

A naphtha feed is contacted in a reaction vessel with a dehydrocyclization catalyst comprising a large-pore zeolite containing at least one Group VIII metal to produce an aromatics product and a gaseous stream, the aromatics product is separated from the gaseous stream and is passed through a molecular sieve which adsorbs paraffins present in the aromatics product, then the gaseous stream is used to strip the paraffins from the molecular sieve, and the gaseous stream and the paraffins are recycled to the reaction vessel.

14 Claims, No Drawings

METHOD OF PRODUCING HIGH AROMATIC YIELDS THROUGH AROMATICS REMOVAL AND RECYCLE OF REMAINING MATERIAL

CROSS REFERENCE TO RELATED CASES

This is a continuation-in-part of application Ser. No. 426,376, filed Sept. 29, 1982 pending.

BACKGROUND OF THE INVENTION

The present invention relates to a new hydrocarbon conversion process wherein a hydrocarbon feed is contacted with a highly selective dehydrocyclization catalyst in a reaction vessel to produce a product stream; then the paraffins in the product stream are extracted and recycled to the reaction vessel.

Catalytic reforming is well known in the petroleum industry. It involves treating naphtha fractions to improve the octane rating by producing aromatics. The hydrocarbon reactions occurring during reforming operation include dehydrogenation of cyclohexanes to aromatics, dehydroisomerization of alkylcyclopentanes to aromatics, dehydrocyclization of acyclic hydrocarbons to aromatics dealkylation of alkylbenzenes, isomerization of paraffins, and hydrocracking reactions which produce light gaseous hydrocarbons, e.g., methane, ethane, propane and butane. Hydrocracking reactions should be particularly minimized during reforming as they decrease both the yield of gasoline boiling products and the yield of hydrogen.

Because of the demand for high octane gasoline for use in motor fuels, etc., extensive research is being devoted to developing improved reforming catalysts and catalytic reforming processes. Catalysts for reforming processes must be able to produce high yields of liquid products in the gasoline boiling range containing large concentrations of high octane number aromatic hydrocarbons and low yields of light gaseous hydrocarbons. The catalysts should possess good activity in order that low temperatures can be used to produce a quality product. The catalysts should also either possess good stability, in order that the activity and selectivity characteristics oan be retained during prolonged periods of operation, or be sufficiently regenerable to allow frequent regeneration without loss of performance.

Catalysts comprising platinum, for example, platinum supported on alumina, are widely used for reforming of naphthas.

Some have proposed the use of certain molecular sieves such as X and Y zeolites, which have pores large enough for hydrocarbons in the gasoline boiling range to pass through. However, catalysts based upon these molecular sieves have not been commercially successful.

In conventional reforming, the hydrocarbons to be converted are passed over the catalyst, in the presence of hydrogen, at temperatures of about 450° C. to 550° C. and pressures of from 50 to 500 psig. Part of the hydrocarbons are converted into aromatic hydrocarbons, and the reaction is accompanied by isomerization and cracking reactions which also convert the paraffins into isoparaffins and lighter hydrocarbons.

The catalysts hitherto used have given fairly satisfactory results with heavy paraffins, but less satisfactory results with $C_6$-$C_8$ paraffins, particularly $C_6$ paraffins. Catalysts based on a type L zeolite are more selective with regard to the dehydrocyclization reaction and produce excellent results with $C_6$-$C_8$ paraffins.

A major recent development was a new dehydrocyclization catalyst which comprises a large-pore zeolite, a Group VIII metal, and an alkaline earth metal. This catalyst has a superior selectivity for dehydrocyclization. This selectivity is so high that most of the paraffins that are not dehydrocyclized remain as paraffins in the product stream, and reduce the octane rating of the resulting product.

SUMMARY OF THE INVENTION

In the present invention, a naphtha feed is contacted in a reaction vessel with a highly selective dehydrocyclization catalyst at process conditions which favor dehydrocyclization to produce an aromatics product and a gaseous stream, the aromatics product is separated from the gaseous stream, the paraffins present in the aromatics product are separated from the aromatics product, then the gaseous stream and the paraffins are recycled to the reaction vessel. Preferably, the dehydrocyclization catalyst is a large-pore zeolite containing at least one Group VIII metal.

Preferably, the paraffins are normal paraffins and single-branched isoparaffins. The paraffins present in the aromatics product can be separated from the aromatics product either by distillation, or by passing the aromatics product through a molecular sieve which adsorbs paraffins present in said aromatics product, and using the gaseous stream to strip said paraffins from the molecular sieve.

DESCRIPTION OF THE PREFERRED EMBODIMENTS

In its broadest aspect, the present invention involves the extraction and recycle of paraffins present in the product stream of a dehydrocyclization process using a highly selective dehydrocyclization catalyst. Preferably, the dehydrocyclization catalyst comprises a large-pore zeolite and a Group VIII metal.

Present catalysts used throughout the industry are all bifunctional containing an acidic component generally a halogen-chloride or, less frequently, fluoride. Some older reforming catalysts contained silica-alumina as the acidic component. These catalysts converted much of the feed components to lighter paraffins in the normal process of producing aromatics from the bulk of the feed. Thus, the incentive for recycling paraffin back to the catalyst for further conversion has not been practical.

The process of the instant invention utilizes a highly selective catalyst which allows at least twice as many of the original paraffins of any given carbon number, compared to the bifunctional catalyst, to remain with the product. To realize the full large potential of this new catalyst, large benefits in hydrogen production, and octane value of the product, recycle of unconverted feed components is essential.

The term "selectivity" is defined as the percentage of moles of acyclic hydrocarbons converted to aromatics relative to moles converted to aromatics and cracked products, i.e., Selectivity = $\dfrac{100 \times \text{moles of acyclic hydrocarbons converted to aromatics}}{\text{moles of acyclic hydrocarbons converted to aromatics and cracked products}}$ Isomerization of paraffins and interconversion of paraffins and alkylcyclopentanes having the same number of carbon atoms per molecule are not considered in determining selectivity.

The selectivity for converting acyclic hydrocarbons to aromatics is a measure of the efficiency of the process in converting acyclic hydrocarbons to the desired and valuable products: aromatics and hydrogen, as opposed to the less desirable products of hydrocracking.

Highly selective catalysts produce more hydrogen than less selective catalysts because hydrogen is produced when acyclic hydrocarbons are converted to aromatics and hydrogen is consumed when acyclic hydrocarbons are converted to cracked products. Increasing the selectivity of the process increases the amount of hydrogen produced (more aromatization) and decreases the amount of hydrogen consumed (less cracking).

Another advantage of using highly selective catalysts is that the hydrogen produced by highly selective catalysts is purer than that produced by less selective catalysts. This higher purity results because more hydrogen is produced, while less low boiling hydrocarbons (cracked products) are produced. The purity of hydrogen produced in reforming is critical if, as is usually the case in an integrated refinery, the hydrogen produced is utilized in processes such as hydrotreating and hydrocracking, which require at least certain minimum partial pressures of hydrogen. If the purity becomes too low, the hydrogen can no longer be used for this purpose and must be used in a less valuable way, for example as fuel gas.

Feedstock

The feedstock used in the present invention can be any aliphatic hydrocarbon or substituted aliphatic hydrocarbon capable of undergoing ring-closure to produce an aromatic hydrocarbon.

Preferably, the feedstock is substantially free of sulfur, nitrogen, metals, and other known poisons for reforming catalysts. This process is especially sensitive to sulfur. The feedstock can be made substantially free of sulfur, nitrogen, metals, and other known poisons by conventional hydrofining techniques plus sorbers that remove sulfur compounds.

Dehydrocyclization Reaction

According to the present invention, the hydrocarbon feedstock is contacted with the catalyst in a fixed bed system, a moving bed system, a fluidized system, or in a batch-type operation. In view of the danger of attrition losses of the valuable catalyst, it is preferred to use either a fixed bed system or a dense-phase moving bed system. The contacting step can be performed in the presence of a physical mixture of particles of a conventional dual-function catalyst of the prior art. In a fixed bed system, the hydrocarbons in the $C_6$ to $C_{14}$ range are preheated by any suitable heating means to the desired reaction temperature and then passed into a dehydrocyclization zone containing a fixed bed of the catalyst. The dehydrocyclization zone may be one or more separate reactors with suitable means therebetween to ensure that the desired conversion temperature is maintained at the entrance to each reactor. The reactants may be contacted with the catalyst bed in either upward, downward, or radial flow fashion. In a multiple bed system, the present catalyst may be used in less than all of the beds, with a conventional dual-function catalyst being used in the remainder of the beds. The dehydrocyclization zone may be one or more separate reactors with suitable heating means therebetween to compensate for the endothermic nature of the dehydrocyclization reaction that takes place in each catalyst bed.

Ordinarily, hydrogen is utilized in amounts sufficient to insure a hydrogen to hydrocarbon mole ratio of about 0 to about 20:1, with best results obtained in the range of about 1:1 to about 6:1. The hydrogen charged to the dehydrocyclization zone will typically be contained in a hydrogen-rich gas stream recycled from the effluent stream from this zone after a suitable gas/liquid separation step.

The reaction conditions include a reactor pressure of about 1 atmosphere to about 500 psig, with the preferred pressure being about 50 psig to about 200 psig. The temperature is preferably about 450° C. to about 550° C. Ordinarily, the temperature is slowly increased during the run to compensate for the inevitable deactivation that occurs to provide a relatively constant value for conversion.

The liquid hourly space velocity (LHSV) used in the instant dehydrocyclization method is selected from the range of about 0.1 to about 20 hr.$^{-1}$, with a value in the range of about 0.3 to about 5 hr.$^{-1}$ being preferred.

Reforming generally results in the production of hydrogen. Thus, hydrogen need not necessarily be added to the reforming system except for pre-reduction of the catalyst and when the feed is first introduced. Generally, once reforming is underway, part of the hydrogen produced is recirculated over the catalyst. The presence of hydrogen serves to reduce the formation of coke which tends to poison the catalyst.

The Dehydrocyclization Catalyst

The dehydrocyclization catalyst according to the invention is a large-pore zeolite charged with one or more dehydrogenating constituents. The term "large-pore zeolite" is defined as a zeolite having an effective pore diameter of 6 to 15 Angstroms.

Type L zeolite, zeolite X, zeolite Y and faujasite are thought to be the best large-pore zeolites for this operation and have apparent pore sizes on the order of 7 to 9 Angstroms. Type L zeolite is described in U.S. Pat. No. 3,216,789. Zeolite X is described in U.S. Pat. No. 2,882,244. Zeolite Y is described in U.S. Pat. No. 3,130,007. U.S. Patent Nos. 3,216,789; 2,882,244; and 3,130,007 are hereby incorporated by reference to show zeolites useful in the present invention.

The preferred catalyst according to the invention is a type L zeolite charged with one or more dehydrogenating constituents.

Type L zeolites are synthetic zeolites. A theoretical formula is $M_{9/n}[(AlO_2)_9(SiO_2)_{27}]$ in which M is a cation having the valency n.

Crystal size also has an effect on the stability of the catalyst. For reasons not yet fully understood, catalysts having large crystals give longer run length than catalysts having small crystals.

Type L zeolites are conventionally synthesized largely in the potassium form, i.e., in the theoretical formula given previously, most of the M cations are potassium. The M cations are exchangeable, so that a given type L zeolite, e.g., a type L zeolite in the potassium form, can be used to obtain type L zeolites containing other cations, by subjecting the type L zeolite to ion exchange treatment in an aqueous solution of appropriate salts. However, it is difficult to exchange all of the original cations, e.g., potassium, since some exchangeable cations in the zeolite are in sites which are difficult for the reagents to reach.

Alkaline Earth Metals

A preferred, but not essential, element of the present invention is the presence of an alkaline earth metal in the dehydrocyclization catalyst. That alkaline earth metal can be either barium, strontium or calcium. Preferably the alkaline earth metal is barium. The alkaline earth metal can be incorporated into the zeolite by synthesis, impregnation or ion exchange. Barium is preferred to the other alkaline earths because the resulting catalyst has high activity, high selectivity and high stability.

In one embodiment, at least part of the alkali metal is exchanged with barium, using techniques known for ion exchange of zeolites. This involves contacting the zeolite with a solution containing excess $Ba^{++}$ ions. The barium should preferably constitute from 0.1 to 35.0 percent of the weight of the zeolite, more preferably from 8 to 15 percent by weight.

Group VIII Metals

The dehydrocyclization catalysts according to the invention are charged with one or more Group VIII metals, e.g., nickel, ruthenium, rhodium, palladium, iridium or platinum.

The preferred Group VIII metals are iridium and particularly platinum, which are more selective with regard to dehydrocyclization and are also more stable under the dehydrocyclization reaction conditions than other Group VIII metals. The preferred percentage of platinum in the catalyst is between 0.1 and 5.0 percent, more preferably from 0.1 to 1.5 percent.

Group VIII metals are introduced into the zeolite by synthesis, impregnation or exchange in an aqueous solution of an appropriate salt. When it is desired to introduce two Group VIII metals into the zeolite, the operation may be carried out simultaneously or sequentially.

By way of example, platinum can be introduced by impregnating the zeolite with an aqueous solution of tetrammineplatinum (II) nitrate, tetrammineplatinum (II) hydroxide, dinitrodiamino-platinum or tetrammineplatinum (II) chloride. In an ion exchange process, platinum can be introduced by using cationic platinum complexes such as tetrammineplatinum (II) nitrate.

Catalyst Pellets

An inorganic oxide can be used as a carrier to bind the zeolite containing the Group VIII metal and alkaline earth metal and give the dehydrocyclization catalyst additional strength. The carrier can be a natural or a synthetically produced inorganic oxide or combination of inorganic oxides. Preferred loadings of inorganic oxide are from 5 to 25 percent by weight of the catalyst. Typical inorganic oxide supports which can be used include aluminosilicates (such as clays), alumina, and silica, in which acidic sites are preferably exchanged by cations which do not impart strong acidity.

When an inorganic oxide is used as a carrier, there are two preferred methods in which the catalyst can be made, although other embodiments could be used.

In one embodiment, the zeolite is made, then the zeolite is ion exchanged with a barium solution, separated from the barium solution, dried and calcined, impregnated with platinum, dried, calcined, and optionally reduced in hydrogen at about 900° F. and then mixed with the inorganic oxide and extruded through a die to form cylindrical pellets, then the pellets are dried and calcined.

In another embodiment, the large-pore zeolite is mixed with the inorganic oxide and extruded through the die to form cylindrical pellets, then the pellets are dried and calcined, then these pellets are ion exchanged with a barium solution, separated from the barium solution, dried and calcined, impregnated with platinum, separated from the platinum solution, dried, and calcined.

After the desired Group VIII metal or metals have been introduced, the catalyst is treated in an oxidizing gas and then reduced in hydrogen at temperatures of from 200° C. to 700° C., preferably 300° C. to 620° C.

At this stage the dehydrocyclization catalyst is ready for use in the dehydrocyclization process. In some cases however, for example when the metal or metals have been introduced by an ion exchange process, it is preferable to eliminate any residual acidity of the zeolite by treating the catalyst with an aqueous solution of a salt of a suitable alkali or alkaline earth element in order to neutralize any hydrogen ions formed during the reduction of metal ions by hydrogen.

Since the selectivity of this dehydrocyclization catalyst is high, the product stream from the dehydrocyclization is comprised predominantly of aromatics and paraffins, plus a small gaseous stream. The aromatics and low octane paraffins are then separated from the gaseous stream using a high pressure separator or other conventional separation technology.

One method of separating the low octane paraffins present in the aromatics product stream from that aromatics product stream is by distillation.

In another method, most of the paraffins are extracted from the aromatics by passing the aromatics and paraffins through a molecular sieve which adsorbs the normal paraffins and some of the isoparaffins present, but not the aromatics. To cause such a separation, the molecular sieve should have an effective pore diameter of from 4.5 to 5.5 Angstroms. Examples of such molecular sieves are silicalite, P-L, A, X, Y, offretite and ZSM, with cations properly used to tailor the size of zeolite opening to accommodate the desired separation.

The gaseous stream is then used to strip the paraffins from the molecular sieve. Then both the gaseous stream and the paraffins stripped from the molecular sieve are recycled to the dehydrocyclization zone. Since both the gaseous stream and the paraffins are recycled, there is no need to separate the paraffins from the gaseous stream.

In another method, most of the paraffins are extracted from the aromatics by solvent extraction. Solvents that can be used in such a solvent extraction include phenol, sulfolane, and n-formyl morpholine.

Thus, by this invention, a highly selective dehydrocyclization catalyst can be used without the octane penalty resulting from the presence of excess low octane and unreacted paraffins. Instead, these paraffins are converted to high octane aromatics.

Another major advantage of this invention is that, since the paraffins are recycled, the severity of the dehydrocyclization reaction can be reduced and still achieve the same yields and octane numbers as when a higher severity dehydrocyclization is used without recycle. This means that the reaction can be operated at lower temperatures, which will result in longer run times.

EXAMPLES

The invention will be further illustrated by the following examples which set forth particularly advantageous method and composition embodiments. While the examples are provided to illustrate the present invention, they are not intended to limit it.

To simulate the present invention, one unit volume of hexane and one unit volume of a hydrocarbon feed were mixed and tested in a nanoreactor for activity.

Prior to the hexane being mixed into it, the hydrocarbon feed contained 41.4 percent by volume paraffins, 51 percent naphthenes, and 7.6 percent aromatics. The mixture of hydrocarbon feed and hexane was hydrofined to remove sulfur, oxygen and nitrogen.

The dehydrocyclization catalyst was prepared by (a) ion exchanging a potassium-barium type L with a sufficient volume of 0.17 molar barium nitrate solution to contain an excess of barium compared to the ion exchange capacity of the zeolite; (b) drying the resulting barium-exchanged type L zeolite catalyst; (c) calcining the catalyst at 590° C.; (d) impregnating the catalyst with 0.8 percent platinum using tetrammineplatinum (II) nitrate; (e) drying the catalyst; (f) calcining the catalyst at 260° C.; and (g) reducing the catalyst in hydrogen at 480° C. to 500° C.

Temperature was adjusted to obtain 50 percent by volume uncoverted $C_6+$, therefore simulating $C_6+$ recycle. The results are shown in Table I.

TABLE I

| Pressure psig | Temp °F. | $H_2/HC$ (Recycle Free) | Benzene Vol % | Paraffin Selectivity |
|---|---|---|---|---|
| 200 | 882 | 4 | 35 | 68 |
| 200 | 878 | 2 | 37 | 75 |
| 100 | 861 | 2 | 40 | 86 |

While the present invention has been described with reference to specific embodiments, this application is intended to cover those various changes and substitutions which may be made by those skilled in the art without departing from the spirit and scope of the appended claims.

What is claimed is:

1. A dehydrocyclization process comprising:
   (a) contacting a naphtha feed in a reaction vessel with a dehydrocyclization catalyst at process conditions which favor dehydrocyclization to produce an aromatics product and a gaseous stream wherein said catalyst is a monofunctional catalyst comprising a large-pore zeolite containing at least one Group VIII metal;
   (b) separating said aromatics product from said gaseous stream;
   (c) separating normal paraffins and a substantial portion of the single-branched isoparaffins present in said aromatics product from said aromatics product; and
   (d) recycling said gaseous stream and said normal and single branched isoparaffins to said reaction vessel.

2. A dehydrocyclization process according to claim 1 wherein said separation step (c) is carried out by solvent extraction using a solvent selected from the group consisting of phenol, sulfolane, and n-formyl morpholine.

3. A dehydrocyclization process according to claim 1 wherein said separation step (c) is carried out by distillation.

4. A dehydrocyclization process according to claim 1 wherein said separation step (c) is carried out by passing said aromatics product through a molecular sieve which adsorbs paraffins present in said aromatics product, and using the gaseous stream to strip said paraffins from the molecular sieve.

5. A dehydrocyclization process according to claim 4 wherein said molecular sieve is zeolite A.

6. A dehydrocyclization process according to claim 1 wherein said large-pore zeolite has an apparent pore size of from 7 to 9 Angstroms.

7. A dehydrocyclization process according to claim 6 wherein said large-pore zeolite is selected from the group consisting of zeolite X, zeolite Y and type L zeolite.

8. A dehydrocyclization process according to claim 7 wherein said large-pore zeolite is a type L zeolite.

9. A dehydrocyclization process according to claim 1 wherein said catalyst contains an alkaline earth metal selected from the group consisting of barium, strontium, and calcium.

10. A dehydrocyclization process according to claim 9 wherein said alkaline earth metal is barium and wherein said Group VIII metal is platinum.

11. A dehydrocyclization process according to claim 10 wherein said catalyst has from 8 to 10 percent by weight barium and from 0.1 to 1.5 percent by weight platinum.

12. A dehydrocyclization process according to claim 1 wherein said catalyst comprises:
   (a) a large-pore zeolite containing platinum; and
   (b) an inorganic binder.

13. A dehydrocyclization process according to claim 12 wherein said inorganic binder is selected from the group consisting of silica, alumina, and aluminosilicates.

14. A dehydrocyclization process comprising:
   (a) contacting a naphtha feed in a reaction vessel with a dehydrocyclization catalyst at process conditions which favor dehydrocyclization to produce an aromatics product and a gaseous stream; wherein said dehydrocyclization catalyst comprises:
      (1) a type L zeolite containing from 8 to 10 percent by weight barium and from 0.1 to 1.5 percent by weight platinum; and
      (2) an inorganic binder selected from the group consisting of silica, alumina, and aluminosilicates;
   (b) separating said aromatics product from said gaseous stream;
   (c) passing said aromatics product through a zeolite A molecular sieve which adsorbs normal paraffins and single-branched isoparaffins present in said aromatics product;
   (d) using the gaseous stream to strip said normal paraffins and single-branched isoparaffins from the molecular sieve; and
   (e) recycling said gaseous stream and said normal paraffins and single-branched isoparaffins to said reaction vessel.

* * * * *